J. RICKEL.
CORN HARVESTER.
APPLICATION FILED JUNE 26, 1909.
976,921.
Patented Nov. 29, 1910.
5 SHEETS—SHEET 3.
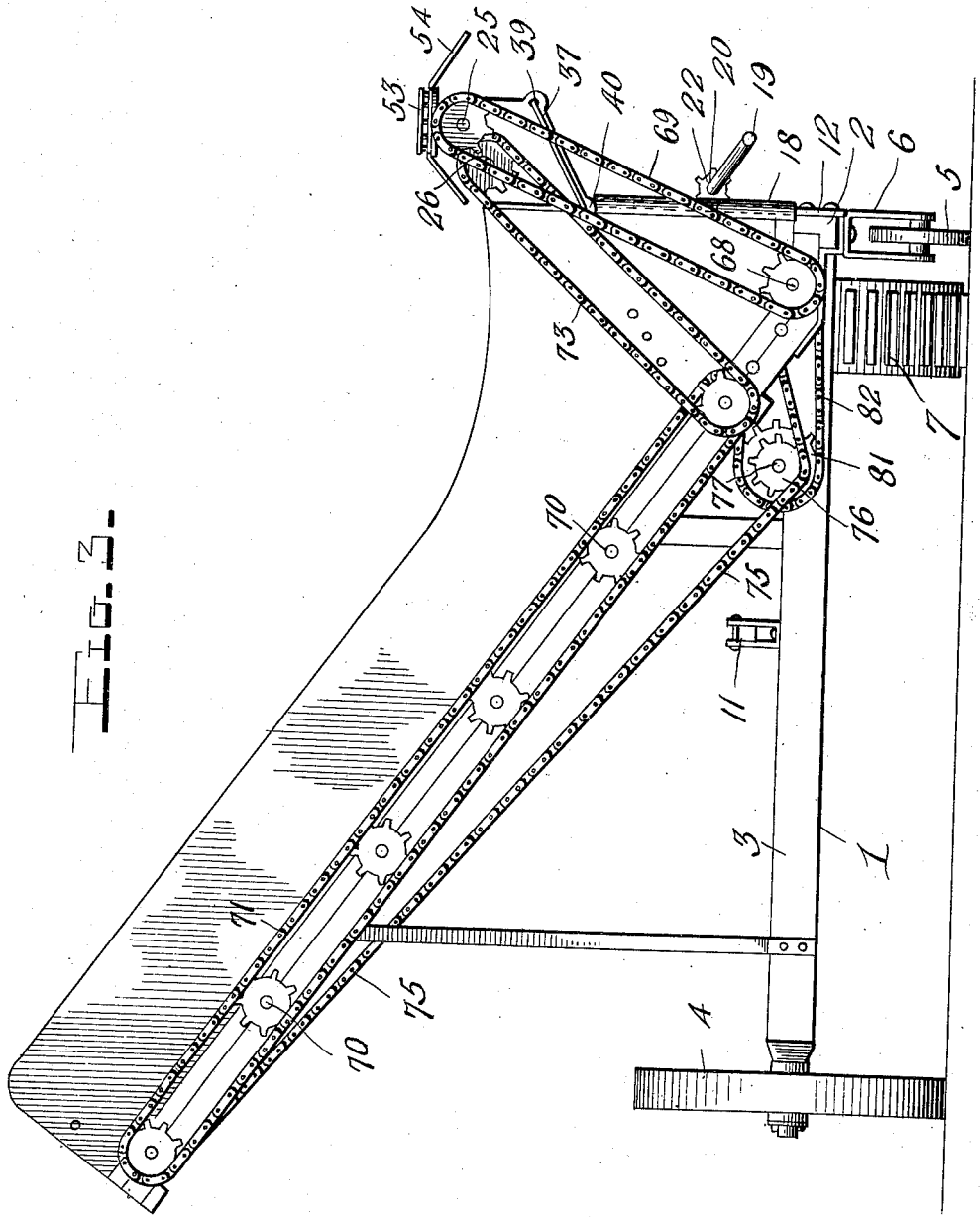

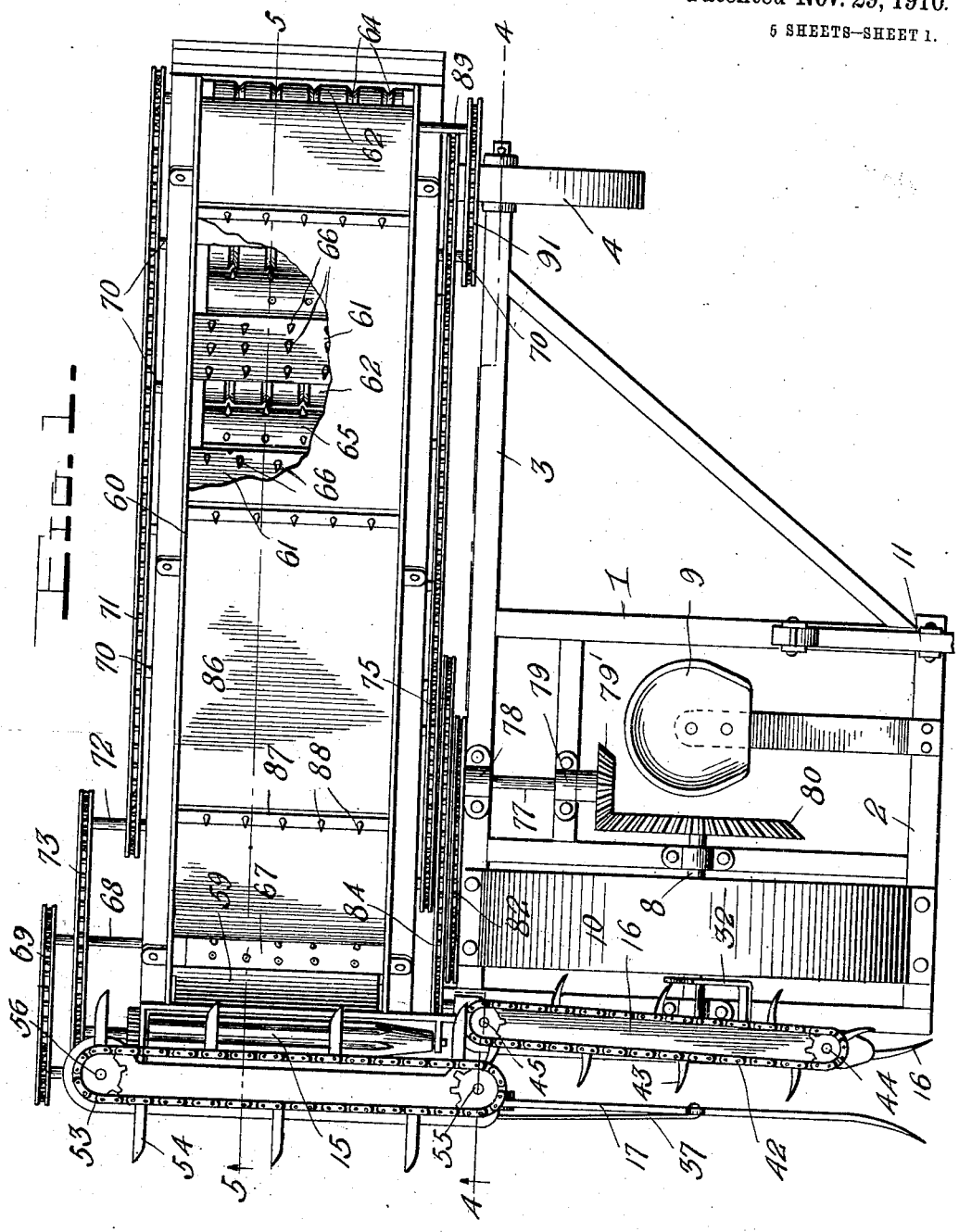

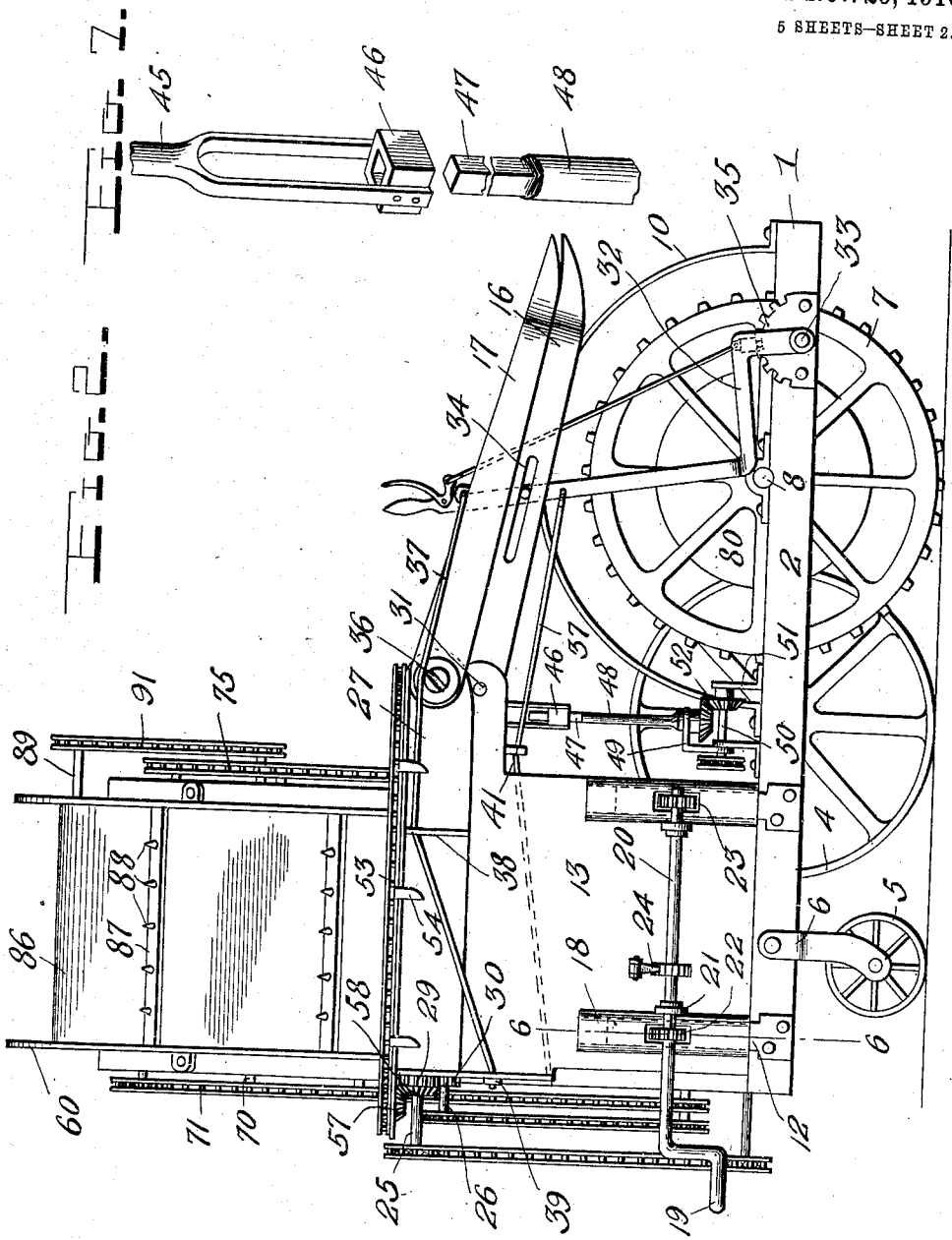

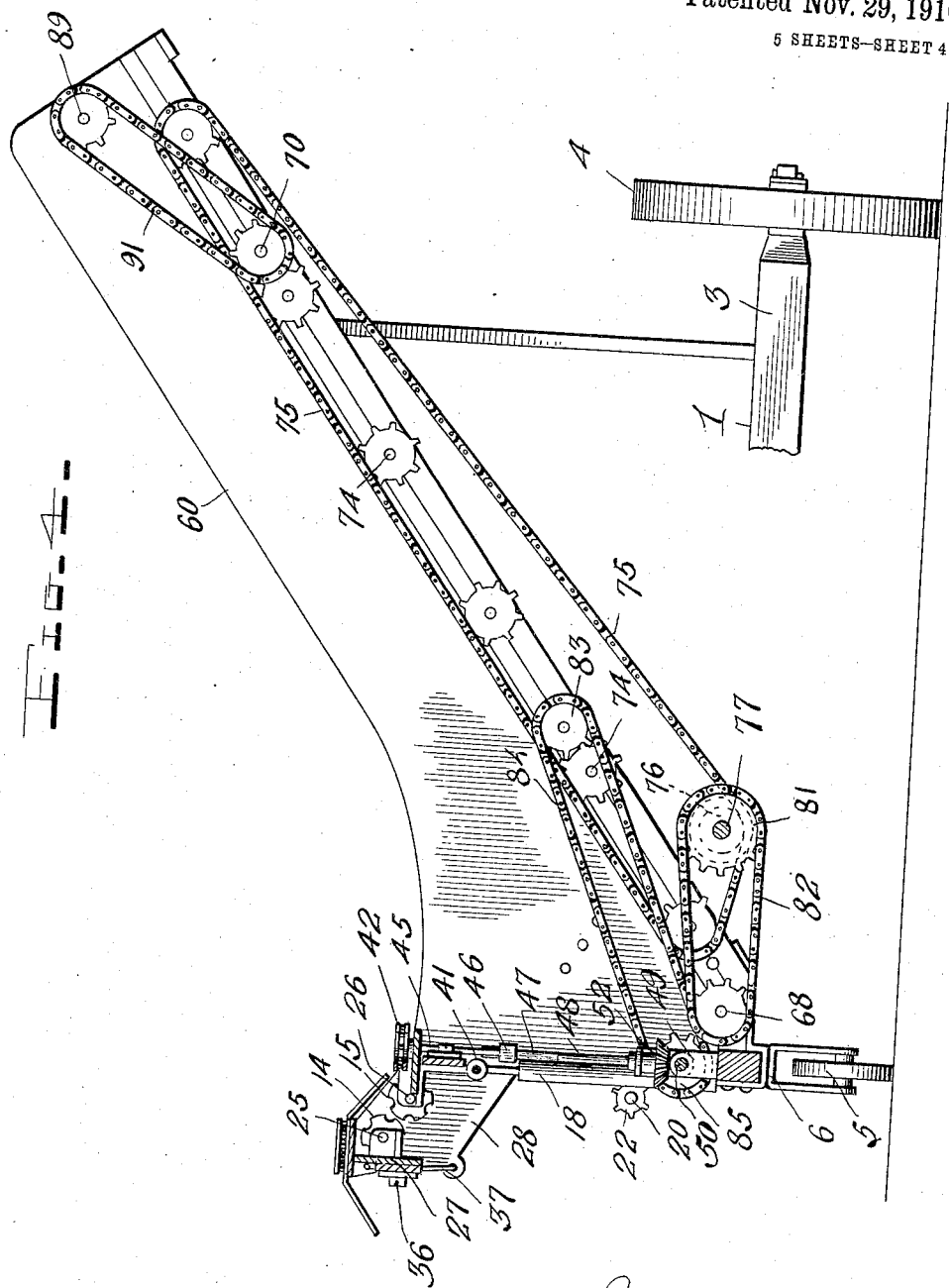

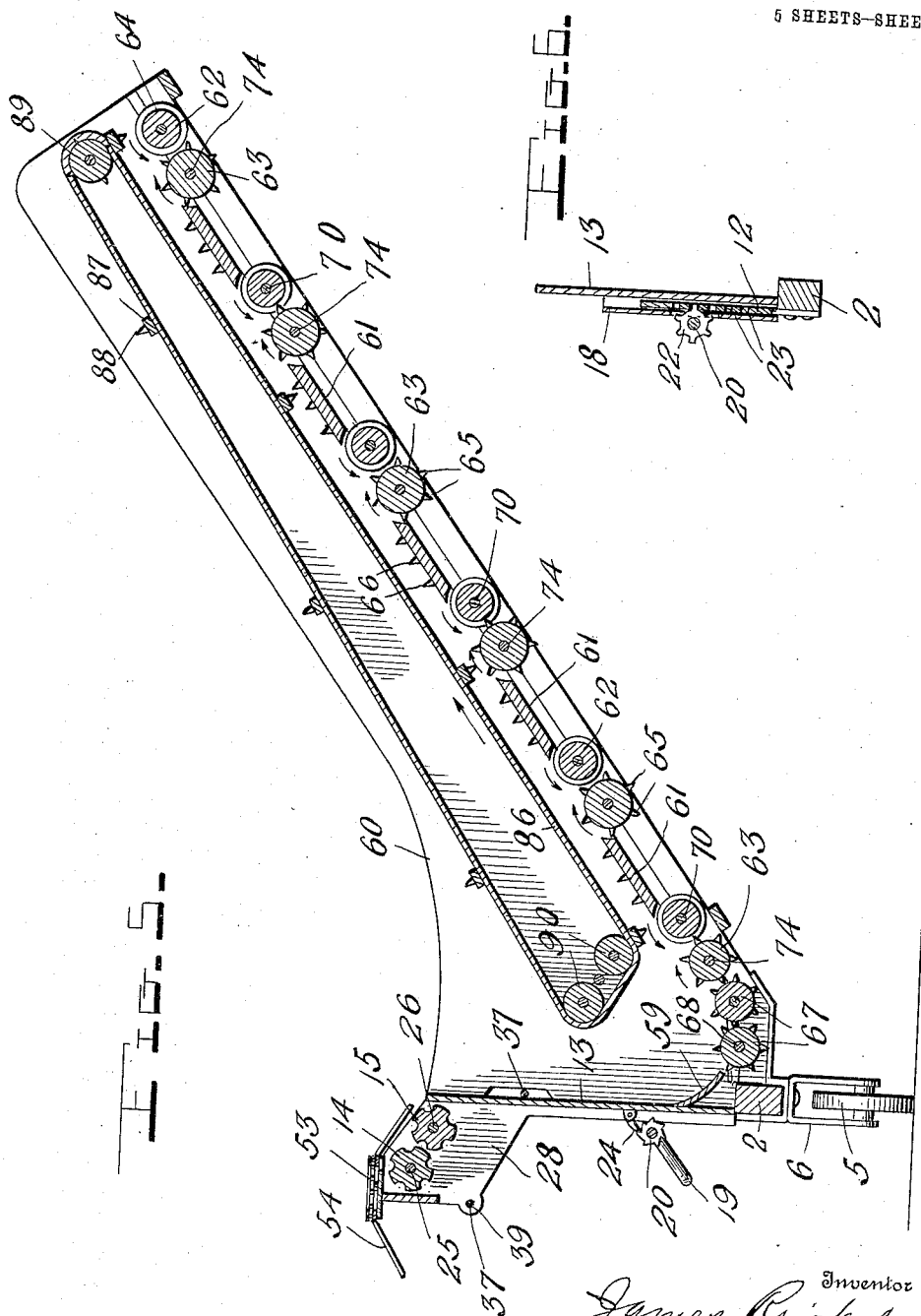

UNITED STATES PATENT OFFICE.

JAMES RICKEL, OF VERNDALE, MINNESOTA.

CORN-HARVESTER.

976,921.      Specification of Letters Patent.      Patented Nov. 29, 1910.

Application filed June 26, 1909. Serial No. 504,558.

*To all whom it may concern:*

Be it known that I, JAMES RICKEL, a citizen of the United States, residing at Verndale, in the county of Wadena and State of Minnesota, have invented certain new and useful Improvements in Corn-Harvesters, of which the following is a specification, reference being had to the accompanying drawings.

This invention relates to improvements in machines for harvesting and husking corn.

The principal object of the invention is to provide a simple and practical machine of this character which when drawn through a field over a row of corn, will strip the ears of corn from the stalks, then husk the ears and discharge them into a suitable receptacle or a wagon driven alongside of the machine.

Further objects of the invention are to provide improved means for feeding the corn to the snapping rolls, improved adjusting means for said feeding means and improved husking means.

With the above and other objects in view, the invention consists of the novel features of construction and the combination and arrangement of parts hereinafter fully described and claimed, and illustrated in the accompanying drawings, in which—

Figure 1 is a plan view of the improved corn harvester showing a portion of its husking belt broken away; Fig. 2 is a side elevation; Fig. 3 is a rear elevation; Figs. 4 and 5 are vertical sections taken, respectively, on the planes indicated by the lines 4—4 and 5—5 in Fig. 1; Fig. 6 is a detail section taken on the plane indicated by the line 6—6 in Fig. 2; and Fig. 7 is a detail view of the extensible shaft.

The machine comprises a main frame 1 having, preferably, a forwardly and rearwardly extending front portion 2 and a transversely extending rear portion 3. One end of the latter is supported by a ground wheel 4 and its other end by a caster wheel 5 which is swiveled at 6; and said front portion 2 of the frame is supported by a bull wheel 7 fixed to a transverse shaft 8. A driver's seat 9 is also arranged on the front portion 2 of the main frame and over the bull wheel is a guard 10 to protect the driver.

11 denotes a draft tongue or pole to which draft animals may be attached, but it will be understood that, if desired, the machine may be propelled by a motor instead of animals.

On the right hand side of the main frame opposite one end of the transverse frame 3 are secured two uprights 12 on which is slidably mounted a support 13 for a pair of snapping rolls 14, 15 and for two gathering arms 16, 17. The support 13 is in the form of an upright plate and has secured on its outer face channel guides 18 which receive and slide upon the uprights 12. Said frame or support 13 is raised and lowered by rotating a crank 19 on a forwardly and rearwardly extending shaft 20 journaled in bearings 21 on the frame 13 and having fixed to it pinions 22 which mesh with rack bars 23 on the uprights 12, said pinions 22 working through slots in the guides 18. A pawl and ratchet locking device 24 is shown in Fig. 2 as provided for locking the shaft 20, but it will be understood that any other means may be provided for locking the frame or support 13 in adjusted position.

The snapping rolls 14, 15 are corrugated and have reduced or tapered forward ends. The outer roll 14 is preferably disposed in a plane slightly above the inner roll 15 and the shafts 25, 26 of said rolls are journaled in bearings provided on the upper portion of the plate 13, and a forwardly and rearwardly extending plate 27, the rear end of which is connected to the plate 13 by a transverse plate 28. Upon the shafts 25, 26 in rear of the plate 28 are fixed meshing gears 29, 30 so that the snapping rolls turn in unison in opposite directions.

The forward ends of the gathering arms 16, 17 are turned outwardly so that the stalks of a row will be deflected between said arms and the rear end of the inner arm 16 is pivoted at 31 to the plate 13. Said arm 16 is adjusted vertically by means of an angular hand lever 32, the lower end of which is pivoted at 33 to the main frame and the upper portion of which carries a pin to work in a longitudinal slot 34 in said arm 16. The lever 32 may be held in adjusted position by the usual pawl and rack locking device 35. The outer arm 17 has its rear end pivoted at 36 to the plate 27 and it is simultaneously raised and lowered with the arm 16 by connecting its intermediate portion to one end of a cable 37 which passes around the plate 28, through guides 38, 39, 40, 41 and has its other end connected to the lever 32, as will be readily understood on reference to Fig. 2.

Upon the arm 16 is mounted an endless chain 42 carrying fingers 43 which feed the stalks between the gathering arms. Said chain passes around sprocket wheels on shafts 44, 45. The shaft 45 has its upper end journaled in a horizontal plate on the top of the arm 16 and its lower end is formed with a hollow or open portion 46 into which telescopes the squared or flat faced upper end 47 of a vertical shaft 48 journaled in a bearing bracket 49 mounted on a horizontal shaft 50 journaled in bearing brackets 51 on the main frame. The lower end of the shaft 48 is connected by beveled gears 52 to the shaft 50, as clearly shown in Fig. 2. A similar endless feed chain 53 is mounted on a horizontal plate on top of the plate 27 and is provided with fingers 54 for feeding the stalks between the snapping rolls 14, 15. Said chain 53 passes around sprocket wheels on front and rear upright shafts 55, 56. The rear shaft 56 is journaled in the rear end of the last mentioned horizontal plate and has on its lower end a beveled gear 57 which meshes with a beveled gear 58 fixed to the shaft 25. The ears of corn as they drop from the snapping rolls fall into a hopper 59 arranged at the lower end of a trough consisting of two upright side plates 60 secured to the transverse frame 3. The bottom of the trough 60 is formed by a plurality of stationary transversely extending plates 61 between which are arranged pairs of co-acting husking rollers 62, 63. These rollers are of cylindrical form, the rollers 62 having annular grooves 64 while the rollers 63 have spurs or teeth 65. If desired, spurs or teeth 66 may be provided on the upper faces of the bottom plates 61. Adjacent the lowermost pair of these husking rollers in the bottom of the hopper 59 are two toothed rollers 67 which are similar to the rollers 63. The shaft 68 of one of the rollers 67 has upon its rear end a sprocket wheel which is connected by a sprocket chain 69 to a sprocket wheel upon the rear end of the shaft 25.

The rear ends of the shafts 70 of the grooved rollers 62 have fixed to them sprocket wheels which are driven simultaneously in the same direction by a sprocket chain 71 and the grooved roller of the lowest pair has the rear end of its shaft extended, as shown at 72 in Fig. 1, and provided with a sprocket wheel which is connected by a sprocket chain 73 to a sprocket wheel upon the rear end of the shaft 26. The forward ends of the shafts 74 of the toothed husking rollers 63 have arranged upon them sprocket wheels which are connected together for simultaneous movement in the same direction by a sprocket chain 75, which latter also passes around a small sprocket wheel 76 fixed to a forwardly and rearwardly extending shaft 77 journaled in bearings 78 79 on the main frame 1 and having its forward end provided with a beveled pinion 79' which meshes with a beveled gear 80 fixed to the axle 8 of the bull wheel. Also arranged on the shaft 77 is a large sprocket wheel 81 which is connected by a sprocket chain 82 on the front end of the shaft 68. Fixed to the forward end of the shaft 70 of one of the grooved husking rollers is a sprocket wheel 83 which is connected by a sprocket chain 84 to a sprocket wheel 85 fixed to the rear end of the shaft 50. By reason of the gearing just described, it will be seen that the motion of the bull wheel will be imparted to the husking rollers and also to the snapping rolls and the feed chains.

The ears of corn are caused to travel up through the trough 60 and over the husking rollers by a flexible belt or apron 86 having transverse slats 87 provided with teeth or spurs 88. Said belt passes over an upper driving roller 89 and over two lower guide rollers 90, as shown in Fig. 5. The driving roller 89 has the front end of its shaft extended and provided with a sprocket wheel which is connected by a sprocket chain 91 to the shaft 70 of one of the grooved husking rollers 64. In this way the apron 86 will be driven so that its lower stretch travels upwardly and holds the ears of corn down upon the husking rollers, which latter rotate in opposite directions, as indicated by the arrows in Fig. 5.

From the foregoing it is thought that the construction, operation and advantages of the invention will be readily understood without a more extended explanation.

While the preferred embodiment of the invention has been shown and described in detail, it will be understood that I do not wish to limit myself to the precise construction set forth and that various changes in the form, proportion and arrangement of parts and in the details of construction may be resorted to without departing from the spirit and scope of the invention.

Having thus described the invention what is claimed is:

1. In a machine of the character described, the combination of a main frame, a vertically adjustable frame thereon, snapping rolls arranged on said vertically adjustable frame, gathering arms arranged in advance of the snapping rolls, an endless fingered feeding chain arranged on one of said arms, a driving sprocket wheel for said chain, a shaft section having said sprocket wheels secured to its upper end and having its lower end provided with a tubular portion, a second shaft section journaled in a bearing upon the main frame and having a flat faced upper end to slide in the tubular lower portion of the first mentioned shaft section, a ground wheel on the main frame, and driving means between said ground wheel and said second shaft section, a fingered feeding chain arranged over said snapping rolls, means for driving the last mentioned chain and said rolls, and means to receive ears of corn from said rolls.

2. In a machine of the character described, the combination of a wheel supported main frame, a vertically adjustable frame, snapping rolls arranged on said vertically adjustable frame, vertically adjustable gathering arms arranged in advance of said snapping rolls, a fingered feeding chain on one of said arms, a fingered feeding chain arranged over said snapping rolls, means for driving said rolls and said chains, a hopper to receive the ears of corn from said rolls, a trough extending upwardly from said hopper, spaced bottom plates in said trough, pairs of husking rollers between said bottom plates, one roller of each pair being grooved and the other having teeth, an endless apron for feeding ears of corn through the trough and over said husking rollers, and means for driving said apron and said husking rollers.

3. In a machine of the character described, the combination of a frame, a pair of gathering arms pivoted for vertical swinging movement, snapping rolls arranged in rear of said arms and means for operating said rolls, an adjusting lever having a slot and pin connection with one of said arms, means for securing said lever in an adjusted position, guides, and a flexible connection arranged in said guides and having one end connected to said lever and its other end to the other of said arms.

In testimony whereof I hereunto affix my signature in the presence of two witnesses.

JAMES RICKEL.

Witnesses:
BENJAMIN COLLINS,
JOHN BECKER.